(No Model.)
E. ROBINSON.
CAR WHEEL.
No. 355,664.          Patented Jan. 4, 1887.
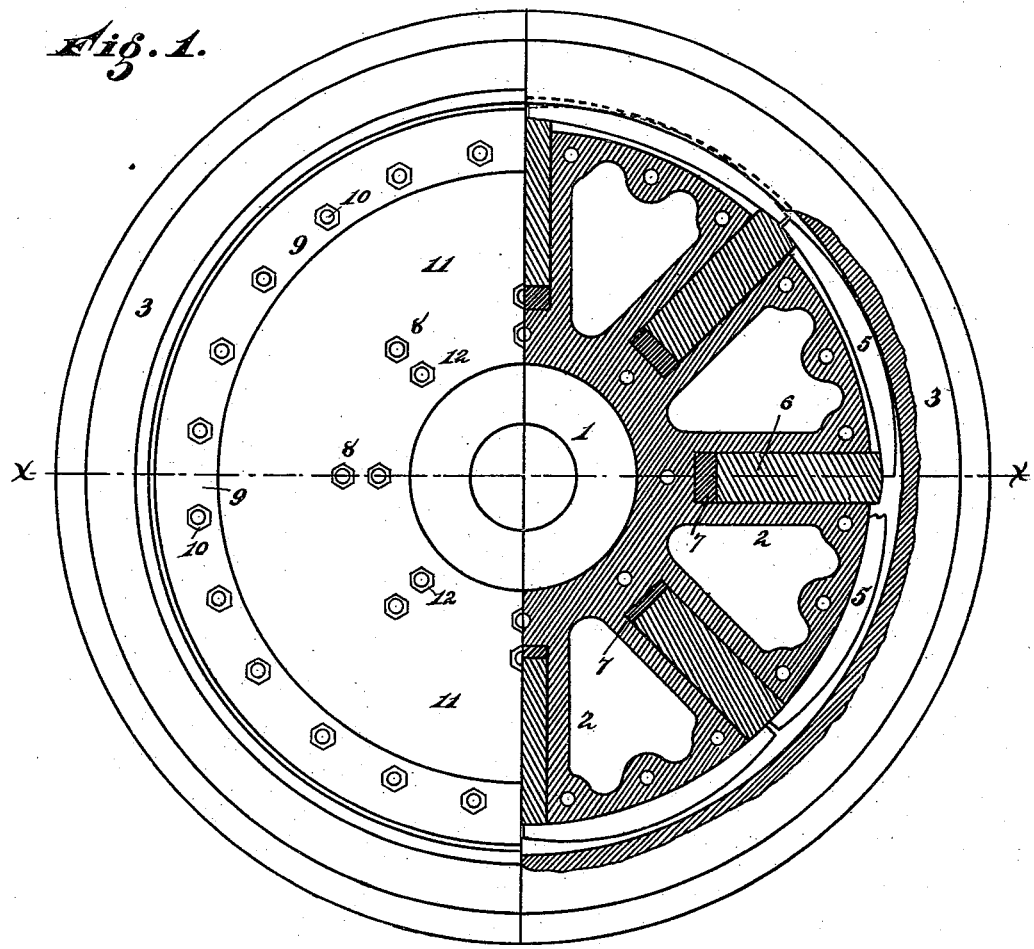
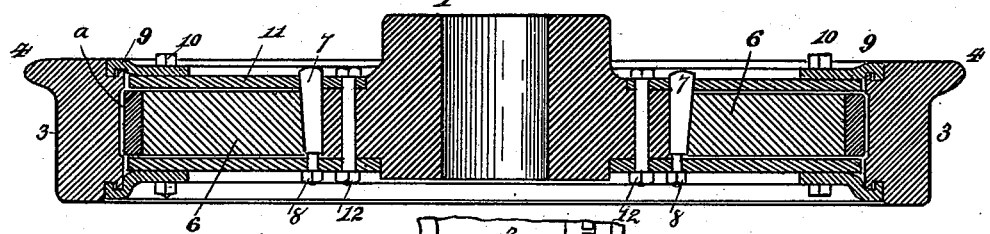
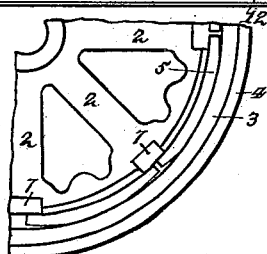

UNITED STATES PATENT OFFICE.

EDGAR ROBINSON, OF CINCINNATI, OHIO, ASSIGNOR OF ONE-HALF TO WOOD & BOYD, OF SAME PLACE.

CAR-WHEEL.

SPECIFICATION forming part of Letters Patent No. 355,664, dated January 4, 1887.

Application filed May 29, 1886. Serial No. 203,642. (No model.)

*To all whom it may concern:*

Be it known that I, EDGAR ROBINSON, a resident of Cincinnati, in the county of Hamilton and State of Ohio, have invented certain new and useful Improvements in Car-Wheels, of which the following is a specification.

My invention relates to the class of car-wheels in which the tread is made separate from the body or center thereof, the object being to produce an elastic wheel which will not be materially effected by the usual expansion and contraction of the tire, and this I accomplish by the use of a series of segmental springs arranged between the tire and the body of the wheel, as will be fully set forth in the description of the accompanying drawings, making a part of this specification, in which—

Figure 1 is a plan view partly in section; Fig. 2, a section on line *x x*, Fig. 1; and Fig. 3 is a modification.

The invention is shown as applied to a plate-wheel; but I do not wish to limit it to such a use, as it is obvious that it may be applied to other classes of wheels in which a tire is used.

1 represents the hub of the wheel, and 2 the spokes or portion of wheel intervening between the hub and tire.

3 represents the tire of the wheel, which is provided with a groove, *a*, in and around its inner periphery, as shown in Fig. 2, and an ordinary flange, 4.

5 represents the series of segmental springs interposed between the body of the wheel and its tire, and of a width to snugly rest in the annular groove of the tire when keyed to position, which may be accomplished by the insertion of a wedge under the ends of the spring, as shown in Fig. 3; but I prefer to make the spokes or center with guideways for the reception of the plungers 6, and to insert the wedge 7 at the base of the plunger, as shown in Figs. 1 and 2. When the wedge is inserted, either with or without the plungers, the springs readily move outward and into the groove in the tire until their center portions come into contact with the bottom of the groove, when the force should be continued until the ends of the springs are moved outward sufficiently to securely unite and combine the whole. The wedges are then secured in position by nuts 8, as shown.

This wheel is very strong under ordinary circumstances, and so elastic as to receive the shocks and jars upon the tread of the wheel within the wheel without communicating the same to the axle and car supported by them. Another advantage is that the tires can be readily removed and others replaced when from any cause it becomes necessary to do so; but perhaps its greatest advantage lies in the protection afforded against accident from expansion of the tire, as it will be readily seen that as the tire expands it will be followed by the springs and all chance of the tire flying off avoided.

9 represents annular plates provided with an annular flange or lip at their outer periphery, which fits in an annular-shaped groove formed in the tire. These annular plates 9 are secured to the spokes and periphery by through-bolts 10. The object of these annular plates is to prevent the tire 3 from coming off in case it should be broken in one or more places.

11 represents annular plates bolted to the spokes. They are provided with openings to receive the wedges 7 and secure the wheel by through-bolts 12. It is obvious that these wedges or keys 7 can be driven in farther at any time in case the wheel should become loose, or to compensate for the contraction and expansion of the wheel in use. Thus at all times a strong elastic wheel may be obtained, with little danger of derailment by the cracking or breaking of the parts of the wheel.

By the use of the spring-segments 5 and the tightening devices 6 7 I secure a strong metallic elastic wheel capable of use on locomotives, tenders, and cars of superior strength and durability.

Having described my invention, what I claim as new is—

1. A car-wheel composed of the hub and spokes with their removable tire, and secured by the interposition of spring-segments 5 and the tapered wedge 7, substantially as specified.

2. In combination with a car-wheel having a removable tire, the spring-segments 5, interposed between the tire and the movable plungers 6, adjusted by the straining-key 7, substantially as specified.

3. In a car-wheel, the combination, with the hub, the hollow spokes 2, and a removable tire, of the springs 5, the plungers 6, and the keys 7, substantially as described.

4. In a car-wheel, the combination of the hub and hollow spokes with the removable tread 3, spring-segments 5, annular plates 9, plunger 6, and straining-key 7, substantially as specified.

5. In a car-wheel employing the spring-segments 5, interposed between the spokes and tread of the wheel, and secured by the plungers and wedges, the annular plates 11, secured upon the disk by through-bolts, substantially as specified.

In testimony whereof I have hereunto set my hand.

EDGAR ROBINSON.

Witnesses:
ROBERT ZAHNER,
EDWARD BOYD.